Nov. 21, 1967  J. F. GOODMAN  3,353,696
SCAVENGER VEHICLE
Filed Dec. 29, 1965  3 Sheets-Sheet 1
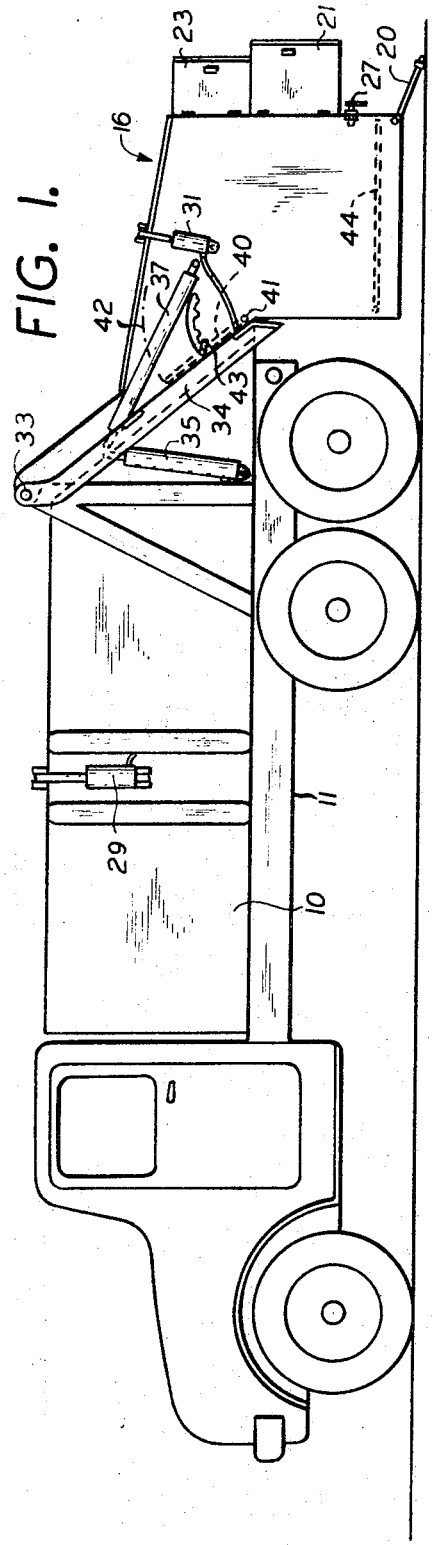
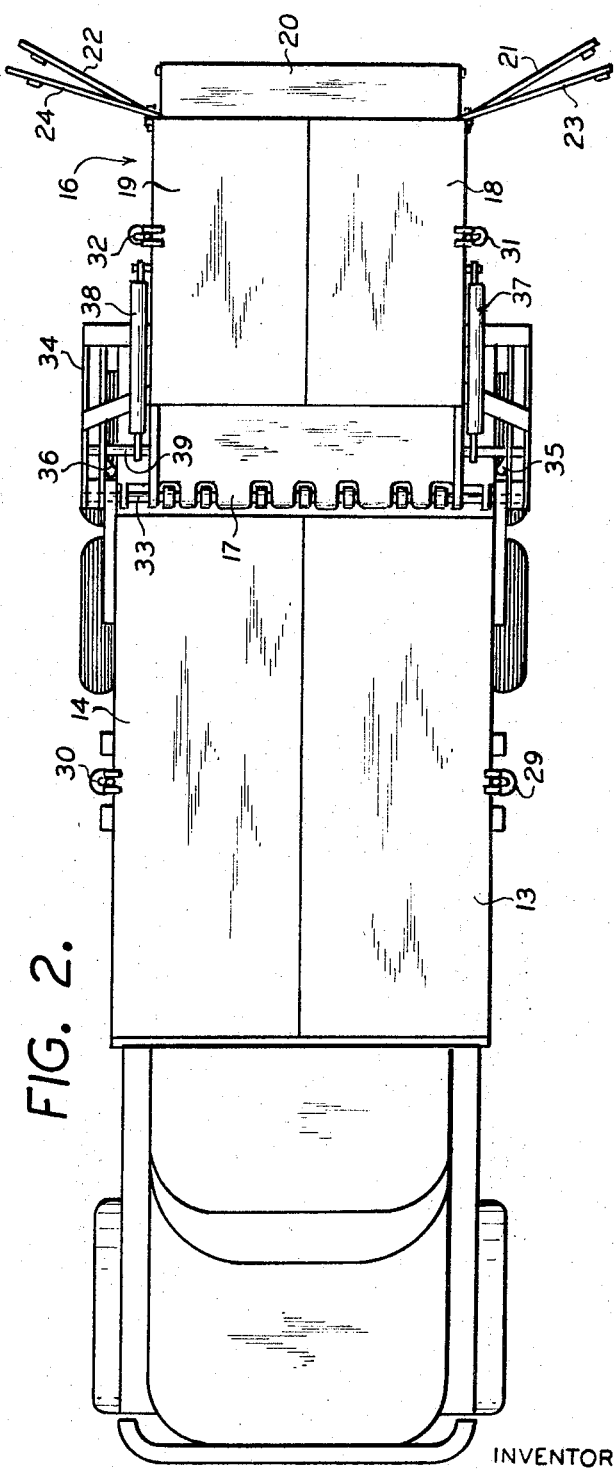
INVENTOR
JOSEPH F. GOODMAN
BY Byerly, Townsend, Watson &
Churchill
ATTORNEYS.

Nov. 21, 1967  J. F. GOODMAN  3,353,696
SCAVENGER VEHICLE
Filed Dec. 29, 1965  3 Sheets-Sheet 2

INVENTOR
JOSEPH F. GOODMAN
BY
*Byerly, Townsend, Watson & Churchill*
ATTORNEYS.

INVENTOR
JOSEPH F. GOODMAN
BY Byerly, Townsend, Watson & Churchill
ATTORNEYS.

United States Patent Office 3,353,696
Patented Nov. 21, 1967

3,353,696
SCAVENGER VEHICLE
Joseph F. Goodman, 600 W. 52nd St.,
New York, N.Y. 10019
Filed Dec. 29, 1965, Ser. No. 517,411
3 Claims. (Cl. 214—501)

ABSTRACT OF THE DISCLOSURE

An auxiliary body portion adapted to receive refuse directly or to accept a mobile refuse cart is pivotally mounted at the upper rear edge of a main dump body for inversion over the main body to deposit its contents therein. Closure means on the auxiliary portion functions in closed position when the auxiliary portion is upended to compact refuse within the main body portion. A tailgate on the auxiliary portion can contact the roadway permitting wheeled carts direct access.

---

The present invention relates to a scavenger vehicle and more particularly to the type of vehicle having its own power driven means for aiding the loading thereof.

Two general types of such vehicles are currently in widespread use; the type with the conveyor for lifting refuse from a receiving point at the rear up and over the main body section, and the type with a reciprocating pusher blade for scooping refuse from a receiver and pushing it into the main storage compartment. Both types lose carrying capacity by virtue of the space occupied by the loading mechanism. In addition, the conveyor type is not readily adapted to handling wheeled refuse carts while the pusher blade type requires auxiliary equipment to first empty the cart into the receiver.

The purpose of the present invention is both to increase the carrying capacity of the vehicle and to simplify the handling of cart loads of refuse.

In accordance with the invention a vehicle is provided comprising a main body portion for receiving refuse mounted on the bed of a truck and having both top and rear openings with openable closures therefor, an auxiliary body portion disposed rearward of the closure for the rear opening and joined pivotally at an upper edge to the main body portion for upending movement about the upper edge over and into the top opening of the main body portion, the top of the auxiliary portion having an opening through which refuse placed in the auxiliary body portion can pass into the main body portion when the auxiliary body portion is upended, means for permitting loading of the auxiliary body portion when it is in its upright position, and means for upending the auxiliary body portion. In addition, the auxiliary body portion is provided with a tailgate which, when dropped, functions as a ramp to permit carts to be wheeled directly into the auxiliary body portion where they are secured and upended to dump their contents directly into the main body portion.

The invention will be better understood after reading the following detailed description of the presently preferred embodiment thereof with reference to the appended drawings in which:

FIGURE 1 is a side view of a scavenger vehicle constructed in accordance with the invention and arranged in loading position to receive a wheeled cart;

FIGURE 2 is a top view of the vehicle shown in FIGURE 1;

Reference should now be had to the drawings wherein the same reference numerals are used throughout to designate the same parts.

Figure 7:
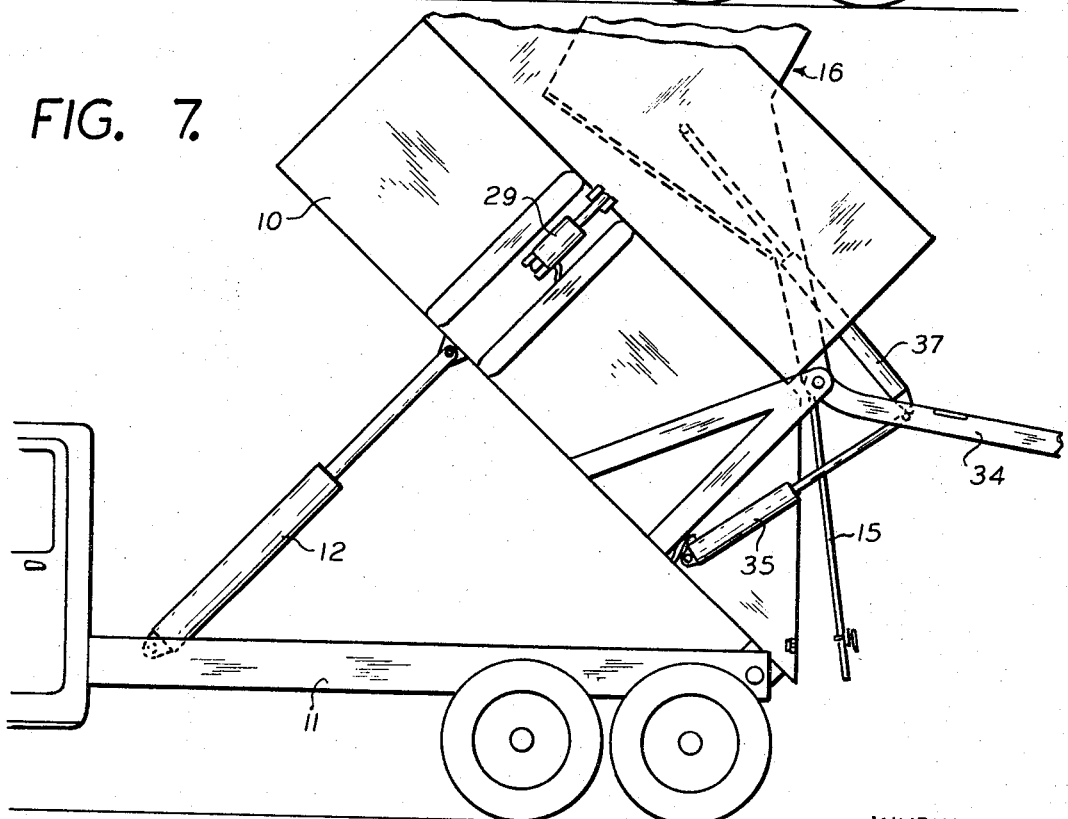
FIGURE 7 shows the vehicle in position for unloading or dumping its load.

A main body portion 10 for receiving refuse is mounted on a conventional truck bed 11. As best seen in FIGURE 7 a tilt mount is employed along with an hydraulic jack mechanism 12.

Figure 5:
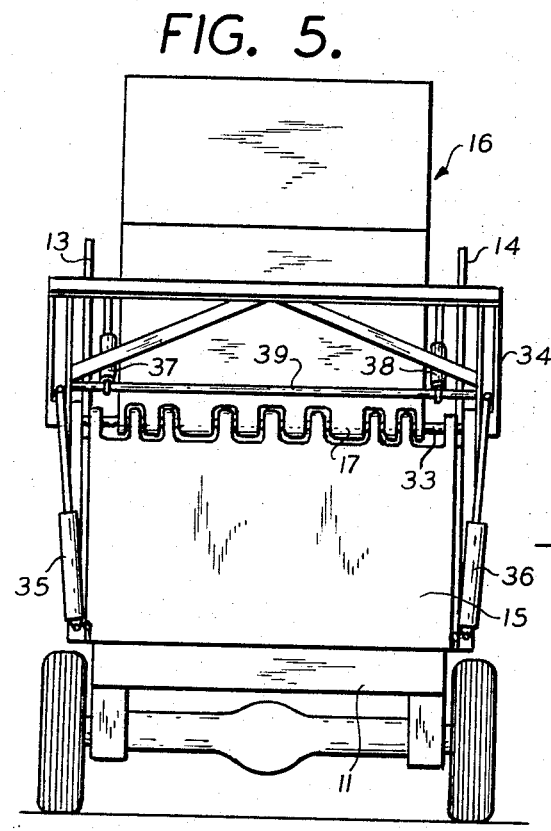
FIGURE 5 is a rear view of the vehicle as shown in FIGURE 4.

The main body portion 10 is provided with top and rear openings, the former having doors 13 and 14 which serve as an openable closure therefor (see FIGURE 2) while an openable closure for the latter is provided by an overhung door 15 (see FIGURES 5 and 7). The auxiliary body portion, designated generally at 16, is disposed rearward of the closure or door 15 and joined pivotally at an upper edge by means of a hinge 17 to the main body portion 10.

The top of the auxiliary body portion 16 is provided with a top opening which, as best seen in FIGURE 2, is closed by a pair of openable doors 18 and 19.

The rear of the auxiliary body portion 16 is completely open but can be selectively closed by means of a drop tailgate or ramp 20, an intermediate pair of side hinged doors 21 and 22, and an upper pair of side hinged doors 23 and 24. Both the tailgate and the doors 21 to 24 are provided with any suitable latching means shown typically at 25 and 26 for the upper and intermediate doors (see FIGURE 3) and at 27 and 28 for the tailgate.

The doors 13 and 14 are hinged to the sides of the main body portion 10 and are actuated between open and closed position by any suitable means such as the hydraulic actuators 29 and 30, respectively. In similar manner, the doors 18 and 19 are hinged to the auxiliary body portion 16 and actuated by the hydraulic actuators 31 and 32, respectively.

Auxiliary body portion 16 is hinged to main body portion 10 by means of a hinge pin, or shaft 33. The overhung door 15 is also pivotally suspended from shaft 33. In addition the shaft 33 supports a frame 34 which can be raised by means of hydraulic actuators 35 and 36 to a position as shown, for example, in FIGURE 4. Another pair of hydraulic actuators 37 and 38 are carried by a cross bar 39 on the frame 34 and joined to the auxiliary body portion for moving the latter about its hinge point beyond the limit of travel of frame 34.

Figure 6:
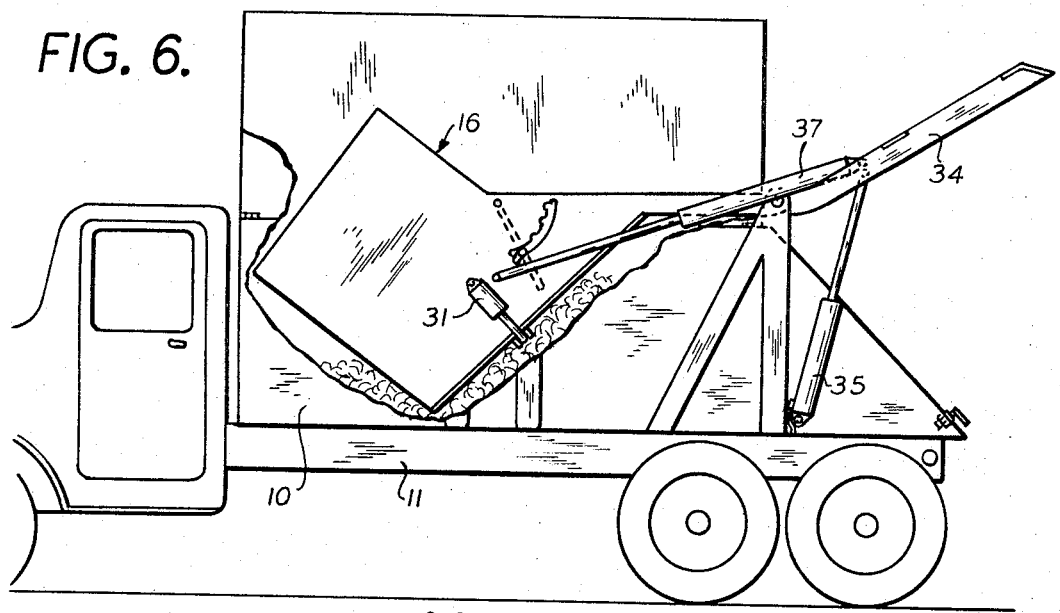
FIGURE 6 is a view similar to FIGURE 4 but showing the auxiliary body portion within the main body portion for compacting the load therein.

FIGURE 6 illustrates the extreme limit of travel provided for the auxiliary body portion so that it can function to compact the contents of the main body portion.

For a purpose to be explained, a swingable deflector plate 40 is mounted within auxiliary body portion 16 at 41 for selectable movement through an arc shown by the phantom line 42 in FIGURE 1. Means 43 are provided for securing the plate 40 in any one of a plurality of selectable positions.

As shown in FIGURE 1, the doors 21 to 24 of the auxiliary body portion 16 are open and the tailgate 20 has been dropped to contact the roadway. A wheeled cart (not shown) loaded with refuse can be rolled directly up the ramp provided by tailgate 20 and secured within the auxiliary body portion 16. While the precise means for securing the cart within the portion 16 will depend upon the size and shape of the cart, a typical and simple arrangement can consist of interior horizontal flanges on opposite side walls of the auxiliary body portion located as at 44. The flanges can be engaged by cooperating flanges on the cart which are located to fit under the flanges on body portion 16.

Figure 4:
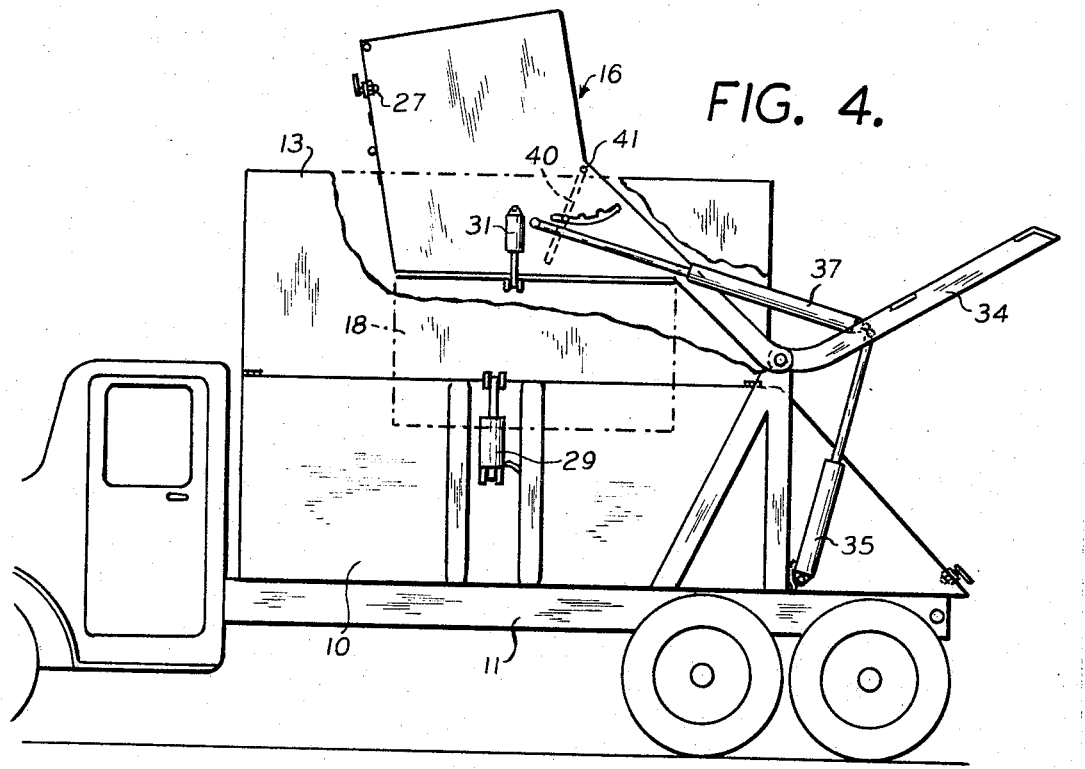
FIGURE 4 is a side view of the vehicle with the auxiliary body portion upended preparatory to dumping its load into the main body portion, portions of the closure for the main body portion being broken away for clarity.

With the cart in place, the tailgate 20 is raised and latched closed and the doors 21 to 24 are bolted shut. While doors 18 and 19 are retained closed, the main doors 13 and 14 are opened by actuators 29 and 30 as best seen in FIGURES 4 and 5. Actuators 35 and 36 are then employed to lift frame 34 along with body portion 16 until the frame reaches its limit of travel whereupon the actuators 37 and 38 can further upend body portion 16 until it reaches a position such as seen in FIGURE 4. Doors 18 and 19 can now be opened by actuators 31 and 32 so as to permit the contents of the cart in body portion 16 to be transferred or dumped into the main body portion 10.

If wheeled carts are not to be employed, the tailgate 20 can remain closed and doors 21 to 24 opened selectively when the body portion 16 is in loading position (FIGURE 1) to permit refuse to be introduced directly into the interior of the body portion 16. It will be appreciated that the portion 16 can be loaded until the contents approach the top of doors 22 and 23 before it becomes necessary to transfer the load to the main body portion.

By controlling the position of the auxiliary body portion 16 over the main body portion 10 when the doors 18 and 19 are opened, and by positioning the deflector plate 40 it is possible to achieve a degree of control over the distribution of the load in the main body portion.

When desirable the doors 18 and 19 on body portion 16 may be held closed and the portion 16 used as a ram or tamper to compress the load in the main body portion 10 as shown in FIGURE 6.

Figure 3:
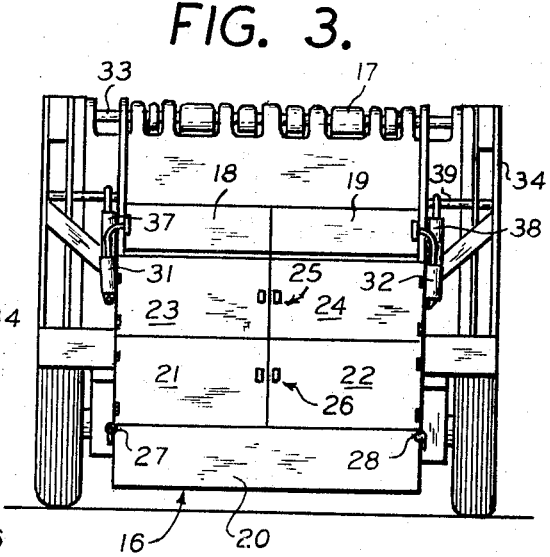
FIGURE 3 is a rear view of the vehicle of FIGURE 1, but showing the closures for the auxiliary body portion in closed position.

Generally, the auxiliary body portion 16 will clear the roadway sufficiently to permit travel at slow to moderate speed when in the lowermost upright position of FIGURES 1 and 3. However, since a roadway clearance on the order of four or five inches is preferred so as not to restrict the capacity of portion 16 it may be necessary to provide additional clearance for more rapid travel and over rough terrain. This can be accomplished by providing positive servo control in known manner for at least one of the pairs of actuators 35, 36 or 37, 38. With the servo control the portion 16 can be elevated to provide the additional clearance and held in the elevated position for an indefinite period. Of course, any other known arrangement for locking the portion 16 in partially elevated position can be employed.

After the main body portion 10 has been filled to capacity, the auxiliary body portion 16 can also be filled to its capacity. Only then is it necessary to travel to a dump to unload.

The presently preferred procedure for unloading is to open doors 13 and 14, upend portion 16, release door 15, then tilt body portion 10, all as shown in FIGURE 7. After or as the main body portion 10 is emptied the doors 18 and 19 can be opened to disgorge the contents of body portion 16.

It should now be apparent that the vehicle described herein has increased load carrying capacity over that of vehicles known heretofore. This follows from the fact that the loading mechanism represented by auxiliary body portion 16 can also carry a load in transit.

While the invention has been described with reference to a presently preferred embodiment thereof it will be understood by those skilled in this art that numerous changes can be made in the details of construction without departing from the true spirit of the invention as defined in the appended claims.

What is claimed is:
1. A scavenger vehicle comprising a main body portion for receiving refuse mounted on the bed of a truck and having both top and rear openings with openable closures therefor, an auxiliary body portion disposed rearward of the closure for said rear opening and joined pivotally at an upper edge to said main body portion for upending movement about said upper edge over and into the top opening of said main body portion, the top of said auxiliary portion having an opening through which refuse placed in said auxiliary body portion can pass into said main body portion when the auxiliary body portion is upended, means for permitting loading of said auxiliary body portion when it is in its upright position, means for upending said auxiliary body portion, closure means for the top opening of said auxiliary body portion which functions in closed position when said auxiliary body portion is upended to compact refuse within said main body portion.

2. A scavenger vehicle comprising a main body portion for receiving refuse mounted on the bed of a truck and having both top and rear openings with openable closures therefor, an auxiliary body portion disposed rearward of the closure for said rear opening and joined pivotally at an upper edge to said main body portion for upending movement about said upper edge over and into the top opening of said main body portion, the top of said auxiliary portion having an opening through which refuse placed in said auxiliary body portion can pass into said main body portion when the auxiliary body portion is upended, means for permitting loading of said auxiliary body portion when it is in its upright position, means for upending said auxiliary body portion, and a selectably positionable deflector plate within said auxiliary body portion for controlling the point of deposit of refuse within the main body portion.

3. A scavenger vehicle comprising a main body portion for receiving refuse mounted on the bed of a truck and having both top and rear openings with openable closures therefor, an auxiliary body portion disposed rearward of the closure for said rear opening and joined pivotally at an upper edge to said main body portion for upending movement about said upper edge over and into the top opening of said main body portion, the top of said auxiliary portion having an opening through which refuse placed in said auxiliary body portion can pass into said main body portion when the auxiliary body portion is upended, means for permitting loading of said auxiliary body portion when it is in its upright position, means for upending said auxiliary body portion, said auxiliary body portion being provided with a rear opening and tailgate assembly which when in lowered position is engageable with the surface on which the truck is standing for permitting refuse carts to be wheeled directly into said auxiliary body portion, and means for removably securing said refuse carts within said auxiliary body portion.

References Cited

UNITED STATES PATENTS 1,776,034  9/1930  Krahn _____ 214—303

FOREIGN PATENTS 591,436  4/1925  France.
562,810  11/1932  Germany.
805,386  5/1951  Germany.

HUGO O. SCHULZ, *Primary Examiner.*